United States Patent
Byrd et al.

(10) Patent No.: US 6,748,488 B2
(45) Date of Patent: Jun. 8, 2004

(54) STORAGE ARRAY HAVING MULTIPLE ERASURE CORRECTION AND SUB-STRIPE WRITING

(75) Inventors: James Byrd, Milpitas, CA (US); Ebrahim Hashemi, Los Gatos, CA (US); Manuel Cisneros, San Carlos, CA (US); Alex Umino, Cupertino, CA (US); John Schell, Westminster, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 299 days.

(21) Appl. No.: 09/966,842

(22) Filed: Sep. 28, 2001

(65) Prior Publication Data

US 2003/0070042 A1 Apr. 10, 2003

(51) Int. Cl.$^7$ .............................................. G06F 12/00
(52) U.S. Cl. ...................................... 711/114; 714/770
(58) Field of Search ......................... 711/114; 714/6–7, 714/52, 763–770

(56) References Cited

U.S. PATENT DOCUMENTS

| | | | |
|---|---|---|---|
| 5,499,253 A | * 3/1996 | Lary | 714/770 |
| 5,579,475 A | * 11/1996 | Blaum et al. | 714/7 |
| 5,671,349 A | * 9/1997 | Hashemi et al. | 714/6 |
| 5,831,393 A | * 11/1998 | Hohenstein et al. | 714/52 |
| 6,148,430 A | * 11/2000 | Weng | 714/770 |
| 6,321,358 B1 | * 11/2001 | Anderson | 714/763 |

OTHER PUBLICATIONS

U.S. patent application Ser. No. 09/678,466, entitled "A Data Storage Subsystem Including a Storage Disk Array Employing Dynamic Data Striping," Lee, et al, filed Oct. 2, 2000.

* cited by examiner

Primary Examiner—Nasser Moazzami
(74) Attorney, Agent, or Firm—Meyertons Hood Kivlin Kowert & Goetzel, P.C.; B. Noël Kivlin

(57) ABSTRACT

A data storage subsystem including an array of storage devices and a storage controller is disclosed. In one embodiment, the array of storage devices stores information in multiple stripes. Each stripe may include a plurality of data blocks and redundancy information in the form of plurality of redundancy blocks. The redundancy information may be generated using an nth order generator polynomial such as a Reed Solomon code. The storage controller may be configured to perform modified read/write stripe updates by: (a) reading original data from a subset of data blocks in a target stripe; (b) reading the original redundancy information for that stripe; (c) comparing the original data with the new data to determine a data difference; (d) calculating a redundancy difference from the data difference; (e) applying the redundancy difference to the original redundancy information to obtain updated redundancy information, (f) writing the new data and updated redundancy information to the target stripe. Multiple erasure correction is also contemplated.

18 Claims, 7 Drawing Sheets

STORAGE ARRAY HAVING MULTIPLE ERASURE CORRECTION AND SUB-STRIPE WRITING

BACKGROUND OF THE INVENTION

1. Field of the Invention

The present invention relates generally to data storage systems having fault protection. More specifically, the invention relates to a RAID system that provides multiple-fault protection with increased write throughput capability.

2. Description of the Related Art

A continuing desire exists in the computer industry to consistently improve the performance and reliability of computer systems over time. For the most part, this desire has been achieved for the processor components of computer systems. Microprocessor performance has steadily improved over the years. However, the performance of the processor in a computer system is only one consideration associated with the overall performance of the computer system. For example, the computer memory system must be able to keep up with the demands of the processor or the processor will become stalled waiting for data from the memory system. Generally computer memory systems have been able to keep up with processor performance through increased capacities, lower access times, new memory architectures, caching, interleaving and other techniques.

Another critical aspect associated with the overall performance of a computer system is the I/O system performance. For most applications, the performance of the mass storage system or disk storage system serves a significant role in the I/O system performance. For example, when an application requires access to more data or information than it has room in allocated system memory, the data may be paged in/out of disk storage and to/from the system memory. Typically the computer system's operating system copies a certain number of pages from the disk storage system to main memory. When a program needs a page that is not in main memory, the operating system copies the required page into main memory and copies another page back to the disk system. Processing may be stalled while the program is waiting for the page to be copied. If storage system performance does not keep pace with performance gains in other components of a computer system, then delays in storage system accesses may poison potential performance gains elsewhere.

One method that has been employed to increase the capacity and performance of disk storage systems is to employ an array of storage devices. An array improves storage performance by providing parallel data paths to read and write information over an array of disks. By reading and writing multiple disks simultaneously, the storage system performance may be greatly improved. For example, an array of four disks that can be read and written simultaneously may provide a data rate almost four times that of a single disk. However, using arrays of multiple disks comes with the disadvantage of increasing failure rates. In the example of a four disk array above, the mean time between failure (MTBF) for the array will generally be one-fourth that of a single disk. It is not uncommon for storage device arrays to include many more than four disks, shortening the mean time between failure from years to months or even weeks. Modern systems address this reliability issue by employing fault protection, or "redundancy", so that data lost from a device failure may be recovered.

A taxonomy of redundancy schemes has evolved for Redundant Array(s) of Independent Disks (RAID) that generally includes the following categories (list compiled by Advanced Computer & Network Corporation www.acnc.com): RAID 0, RAID 1, RAID 10, RAID 0+1, RAID 2, RAID 3, RAID 53, RAID 4, RAID 5 and RAID 6.

RAID 0 is something of a misnomer, as it does not provide any redundancy. It achieves enhanced I/O performance by breaking the data into blocks, and reading/writing the blocks in parallel on separate disks. The procedure of breaking a chunk of data into blocks and storing each of the blocks on a respective disk is commonly called "striping", because the chunk of data appears as a stripe across all the disks.

RAID 1 provides single fault-protection by providing duplicate disks for each of the disks in a RAID 0 array. This provides each disk in the system with a backup (also referred to as a "shadow" or a "mirror"). Although the cost is high, the simplicity of design often makes this scheme desirable. In one configuration, multiple RAID 1 systems are coupled together with a RAID 0 controller, to form a system referred to as RAID 1+0 or RAID 10 system. RAID 0+1 is similar, but is constructed using two RAID 0 arrays, one of which mirrors the other.

RAID 2 provides fault protection by employing a Hamming code. The data words are encoded using a Hamming code to obtain corresponding code words. Each bit of the code word is then written to a respective drive.

RAID 3 provides single-fault protection by employing a parity-check bit and a dedicated parity drive. Generally the data disks are written synchronously and the corresponding parity-check data is generated dynamically and stored synchronously on the parity disk. Similarly, the data and parity disks are read synchronously and the verification (or data regeneration in the event of a disk failure) is performed dynamically. RAID 53 uses a RAID 0 architecture in which each of the disks are replaced with a RAID 3 system.

RAID 4 is similar to RAID 3, but the synchronous reading and writing requirement is removed. RAID 5 is a modification of RAID 4, in which the parity-check data is distributed across all of the disks, i.e. each of the disks store comparable amounts of data and comparable amounts of parity-check information. This causes the extra "parity-check" disk to look statistically like all the other disks, which results in a more balanced load on each of the disks.

FIG. 1 illustrates a RAID 5 system, in which both data (denoted 'A', 'B', 'n') and parity information (denoted 'P') are striped across a storage device array. In a RAID 5 system, a stripe that spans all N of the disks in the array includes (N−1) data blocks and one block of the parity information that is computed over the (N−1) data blocks. The location of the parity block is shifted as a function of the stripe position. This balances the loading of the drives.

In a RAID5 system, when a subset of the data blocks within a stripe is updated, the parity block is typically also updated. The parity may be updated in either of two ways. The parity may be updated by reading the remaining unchanged data blocks and computing a new parity in conjunction with the new blocks (unmodified read/write stripe update), or reading the old version of the changed data blocks, comparing them with the new data blocks, and applying the difference to the parity (modified read/write stripe update). Generally, an unmodified read/write stripe update is preferable if the number of altered data blocks exceeds (N−r)12, where r is the number of redundancy blocks in a stripe, and a modified read/write stripe update is preferable otherwise.

While some configurations of disk arrays such as RAID 5 systems provide relatively high performance and economical storage that are capable of rebuilding data in the event of single drive failures, if two drives fail, data is irretrievably lost. It is therefore sometimes desirable to provide configurations that are capable of rebuilding data in the event that multiple drives fail. RAID 6 is one such configuration. While the term "RAID 6" has sometimes suffered from inconsistent usage, the term is used herein to mean an extension of RAID 5 that employs two functions, sometimes referred to as P and Q parities, to provide double-fault protection. A primary difference between RAID 5 and RAID 6 is that RAID 6 uses twice as much redundancy for fault protection.

Each of the RAID schemes has advantages and disadvantages. It is thus often desirable to provide a single storage controller that can operate in any one of multiple storage modes. In addition, while systems that provide double fault protection such as RAID 6 configurations are generally known, some implementations of these systems suffer from relatively poor performance characteristics.

SUMMARY OF THE INVENTION

A data storage subsystem including an array of storage devices and a storage controller is disclosed. In one embodiment, the array of storage devices stores information in multiple stripes. Each stripe may include a plurality of data blocks and redundancy information in the form of plurality of redundancy blocks. The redundancy information may be generated using an nth order generator polynomial such as a Reed Solomon code. The storage controller may be configured to perform modified read/write stripe updates by: (a) reading original data from a subset of data blocks in a target stripe; (b) reading the original redundancy information for that stripe; (c) comparing the original data with the new data to determine a data difference; (d) calculating a redundancy difference from the data difference; (e) applying the redundancy difference to the original redundancy information to obtain updated redundancy information, (f) writing the new data and updated redundancy information to the target stripe.

In one particular embodiment, the storage controller may be configured to calculate redundancy blocks using a two-term, second order Reed-Solomon generator polynomial. The first redundancy term of a resulting code word polynomial is equal to a simple parity expression of the associated data words. This single redundancy term may thus be used to support RAID 5 configurations, and the storage controller may be configured to programmably support both RAID 5 configurations and RAID 6 configurations without extensive changes to the Reed-Solomon encoding and decoding functionality.

BRIEF DESCRIPTION OF THE DRAWINGS

For a more detailed description of the preferred embodiment of the present invention, reference will now be made to the accompanying drawings, wherein.

Figure 1:
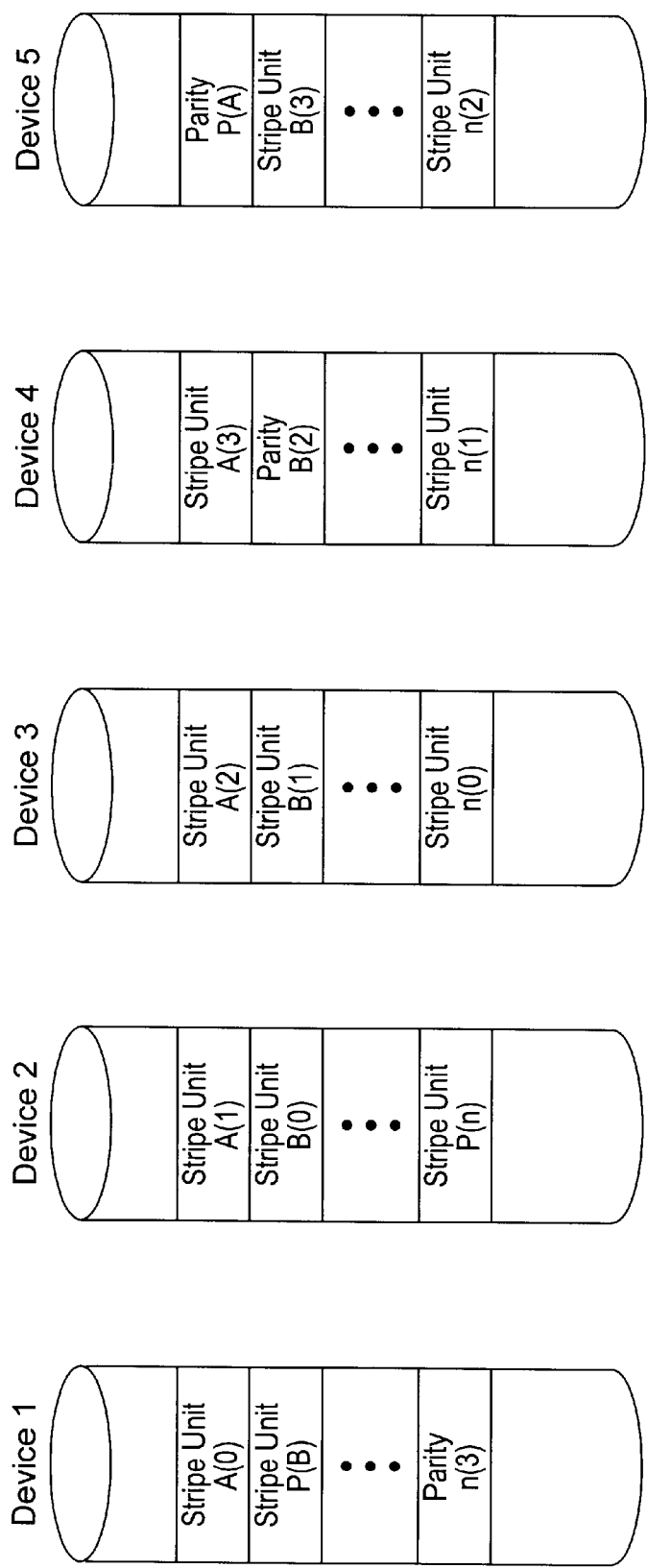
FIG. 1 shows a conventional RAID 5 storage arrangement.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 2:
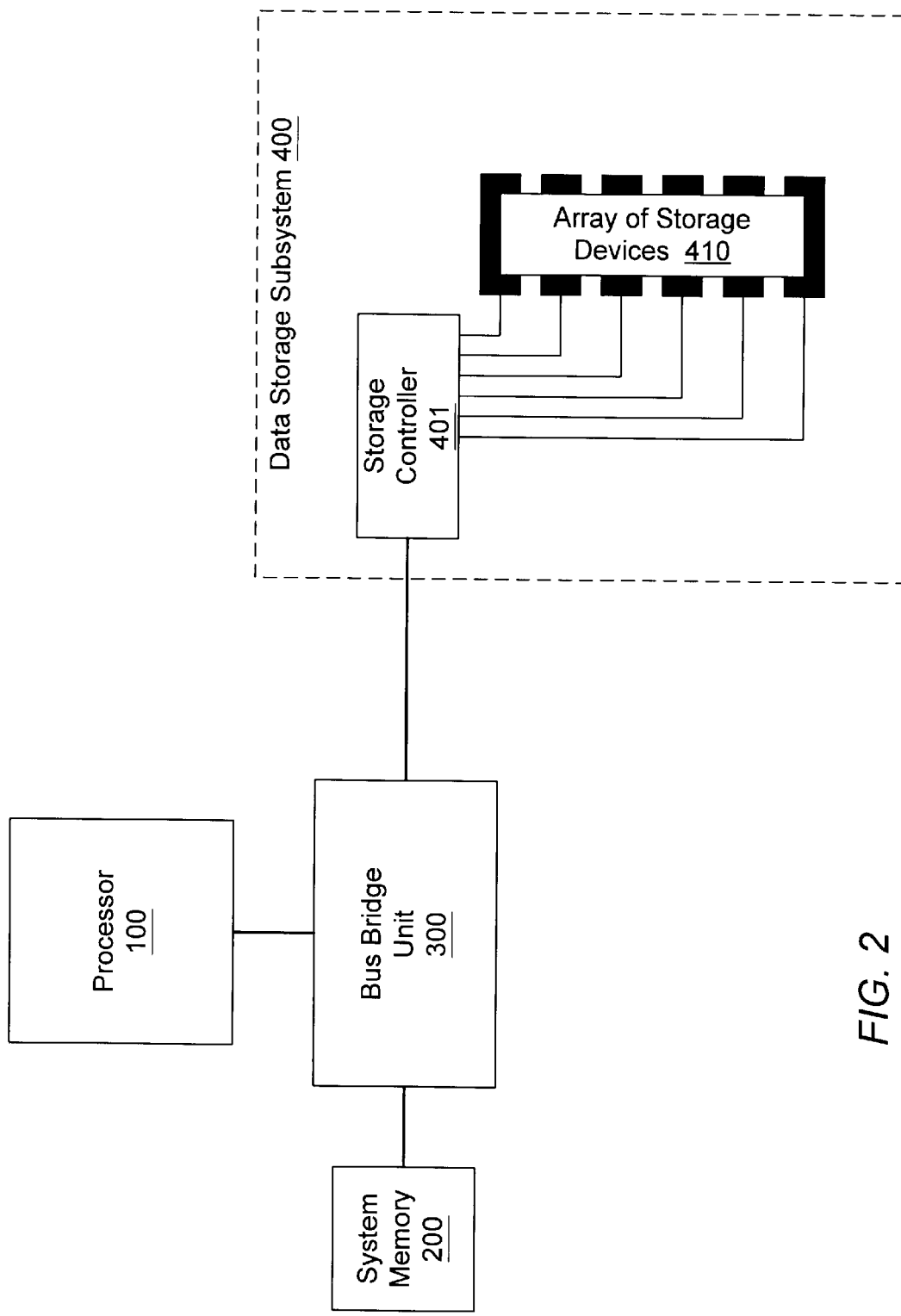
FIG. 2 shows a block diagram of a computer system embodiment including a data storage subsystem.

Referring now to FIG. 2, a block diagram is shown of one embodiment of a computer system having a data storage subsystem. The computer system includes a main processor 100 coupled to a bus bridge unit 300. Bus bridge unit 300 is coupled to a system memory 200 and to a data storage subsystem 400. System memory 200 may be used by processor 100 to temporarily store data and software instructions which must be accessed rapidly during system operation. Bus bridge 300 may contain hardware to control system memory 200 and data storage subsystem 400. As will be described further below, data storage subsystem 400 includes an array of storage devices which may also store data and software instructions.

Figure 3:
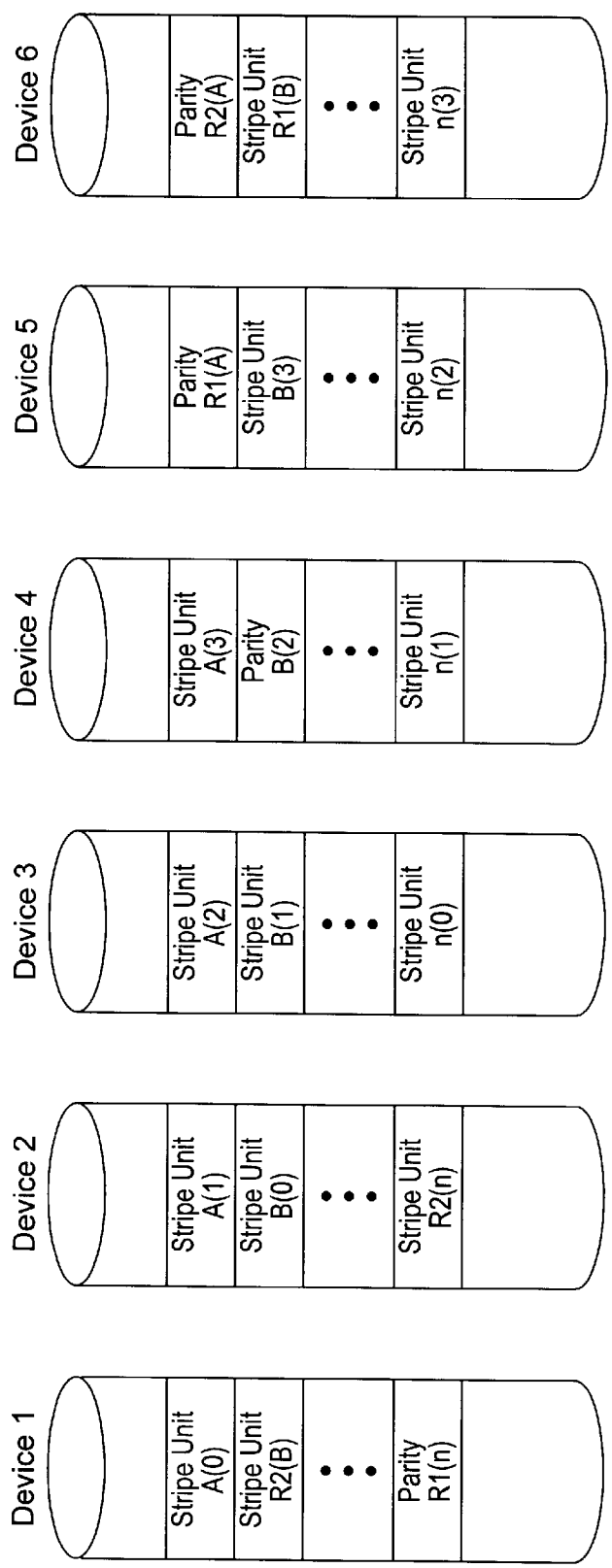
FIG. 3 shows a striping storage arrangement in a disk array.

The data storage subsystem 400 includes a storage controller 401 coupled to an array of storage devices 410. FIG. 3 illustrates a manner in which data (denoted 'A', 'B', 'n') and redundancy information (denoted 'R1', 'R2') may be striped across the array of storage devices 410. In the illustrated embodiment, a stripe includes (N−2) data blocks and 2 redundancy blocks calculated over the (N−2) data blocks. However, more redundancy blocks may be provided, and are within the contemplation of this invention. The locations of the redundancy blocks may be shifted as a function of the stripe position, as shown.

In the embodiment of FIGS. 2 and 3, array of storage devices 410 includes six storage devices shown as storage device 1 through storage device 6 (FIG. 3). It is noted that in other embodiments, arrays having different numbers of storage devices may be used. When processor 100 of FIG. 2 writes data to data storage subsystem 400, storage controller 401 is configured to separate the data into data blocks, calculate the redundancy blocks, and distribute the resulting stripe across the array of storage devices 410 in a manner such as that shown in FIG. 3. For example, two redundancy blocks R1(A) and R2(A) are computed for the 'A' data stripe and the result of the data write is shown in FIG. 3. The data has been divided into four data blocks, A(0) through A(3) and stored on storage devices 1 through 4, respectively. Stripe A's redundancy blocks R1(A) and R2(A) are respectively stored in storage devices 5 and 6. Subsequent data writes may be performed in a similar fashion, with the stripes being circularly rotated across the storage devices for load balancing. Thus, for example, stripe B's data blocks would be written on storage devices 2, 3, 4, and 5, and the redundancy blocks for stripe B would be written on storage devices 6 and 1. As used herein, a data block is a grouping of data bits. Similarly, a redundancy block is a grouping of redundancy bits.

When a subset of the data blocks within a stripe is updated, the redundancy blocks are updated. The redundancy blocks may be updated by reading the remaining unchanged data blocks and computing new redundancy information in conjunction with the updated blocks. The storage controller 401 may alternatively perform modified read/write stripe updating of the redundancy information by reading the old version of the changed data blocks, comparing the old version of the data to the new data blocks, and determining a redundancy difference for application to the old redundancy blocks. These operations will be described in further detail below.

As will be described in further detail below, storage controller 401 employs a Reed-Solomon code to generate the redundancy information. In one embodiment, a Reed-Solomon code implementation is employed that simultaneously provides parity and higher order redundancy information, and which enables modified read/write stripe updates.

Figure 4:
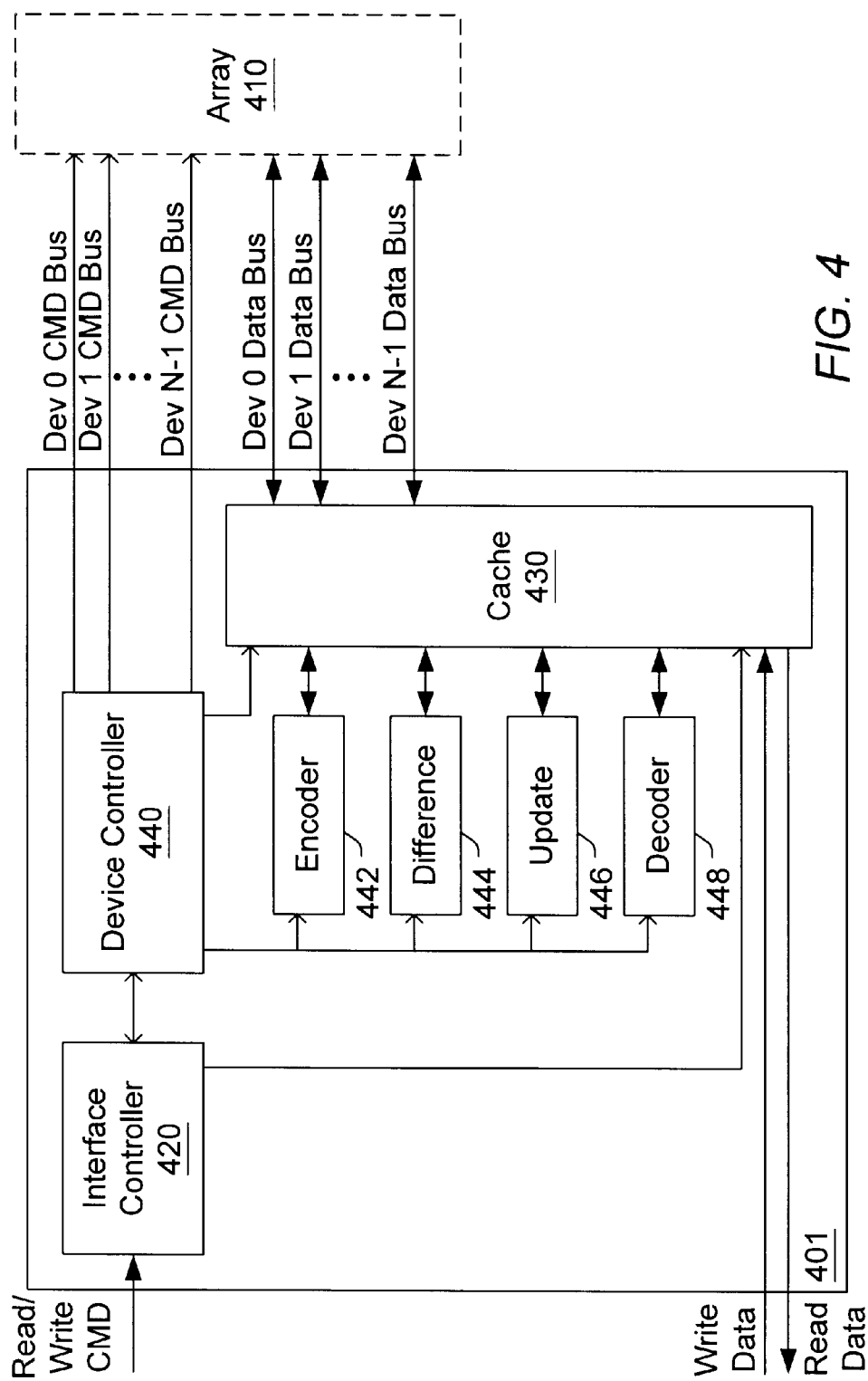
FIG. 4 shows a block diagram of a storage controller.

FIG. 4 shows a functional block diagram of one particular implementation of storage controller 401. The storage controller of FIG. 4 includes an interface controller 420, a cache memory 430, a device controller 440, an encoder unit 442, a difference unit 444, an update unit 446, and a decoder unit 448. The interface controller 420 receives read/write commands from an I/O bus, while the cache 430 is coupled to receive write data from the I/O bus and to provide read data to the I/O bus in response to control signals from the interface controller 420. Upon receiving a write command, the interface controller 420 causes the cache 430 to store the write data, and notifies the device controller 440 that an array storage procedure needs to be initiated. Upon receiving a read command, the interface controller 420 determines if the data is stored in the cache 430, and if so, causes the cache 430 to provide the data to the I/O bus. If the data is not in the cache, the interface controller 420 causes the device controller 440 to initiate an array retrieval procedure.

The device controller 440 is coupled to control accesses to each of the storage devices in array 410, and is coupled to the cache 430 to cause the cache to provide data to selected storage device data buses or to store data from selected storage device data buses. The device controller 440 is further configured to control the encoder unit 442, the difference unit 444, the update unit 446, and the decoder unit 448. The device controller 440 may be configured to selectively cause each of the units 442, 444, 446 and 448 to operate upon a set of designated blocks stored in the cache 430 (or in array 410) and to write result blocks back to the cache 430 (or in array 410). The encoder unit 442 is configured to process a set of data blocks in a stripe to compute the corresponding redundancy blocks, and to process a subset of difference blocks to compute redundancy difference blocks, as will be described in further detail below. The difference unit 444 is configured to combine two data blocks to determine a difference block. The update unit 446 is configured to update redundancy blocks by combining them with redundancy difference blocks. The decoder unit 448 is configured to determine correct data blocks in a stripe from remaining data blocks in the stripe, assuming the number of erroneous data blocks is less than the maximum fault tolerance. Further details regarding this functionality are provided below.

As stated previously, in the embodiment of FIGS. 2 and 3, the redundancy information R1 and R2 is generated using a Reed-Solomon code. Reed-Solomon codes are designed using the principles of finite field theory. A field is a set of elements along with two defined operations on the elements. The operations are typically denoted by operators '+' and '×'. A field is constructed so as to have the following properties:

1. The set is closed under both operators (if a and b are elements of the field, so are a+b and a×b).
2. Both operators are commutative (a+b=b+a, a×b=b×a).
3. Both operators are associative (a+[b+c]=[a+b]+c, a×[b×c]=[a×b]×c).
4. Each operator has a unique identity element (a+0=a, a×1=a).
5. One operator is distributive across the other (a×[b+c]= a×b+a×c).
6. Every element has a unique additive inverse (a+[−a]= 0).
7. Every non-zero element has a unique multiplicative inverse (a×a$^{-1}$=1).

Fields that are finite (the number of elements is not infinite) are called "Galois fields" (named after their discoverer) and denoted GF(p), where p is the number of elements in the field.

Galois fields may be expressed in many forms. When p is a power of a prime number (i.e. p=q$^m$, where q is prime), the elements of GF(p)=GF(q$^m$) are often expressed in the form of a polynomial:

$$a=k_{m-1}x^{m-1}+k_{m-2}x^{m-2}+ \ldots +k_2x^2+k_1x+k_0$$

where $k_i$ are integers between 0 and (q−1), inclusive, and the powers of x simply function as placeholders. The addition operator for this form of GF(q$^m$) is polynomial addition, modulo q. This is most clearly illustrated by an example. If a second element of GF(q$^m$) is:

$$b=l_{m-1}x^{m-1}+l_{m-2}x^{m-2}+ \ldots +l_2x^2+l_1x+l_0$$

then $$a+b=[(k_{m-1}+l_{m-1})mod\ q]x^{m-1}+[(k_{m-2}+l_{m-2})mod\ q]x^{m-2}+ \ldots +[(k_2+l_2)mod\ q]x^2+[(k_1+l_1)mod\ q]x+[(k_0+l_0)mod\ q]$$

The multiplication operator for this form of GF(q$^m$) is slightly more tricky because it requires the use of an "irreducible polynomial" P(x) of degree m. Even though the powers of x terms are used as placeholders in expressing elements as polynomials, some interesting properties of polynomials can be discerned by evaluating the polynomials, i.e. setting x equal to an integer value. For our purposes, a polynomial P(x) is irreducible if P(x)≠0 for each value of x between 0 and (q−1), inclusive. (Irreducible polynomials can be found by exhaustive search if no other means are available.) The multiplication operator for GF(q$^m$) is polynomial multiplication, modulo P(x). Thus:

$$a \times b=(k_{m-1}x^{m-1}+k_{m-2}x^{m-2}+ \ldots +k_2x^2+k_1x+k_0)(l_{m-1}x^{m-1}+l_{m-2}x^{m-2}+ \ldots +l_2x^2+l_1x+l_0)mod\ P(x)$$

In both instances above, the modulo operation yields a remainder after division by the modulo operand. For example, in the addition operation above, the coefficients are added modulo q. This means that the sum is divided by q, and the remainder is the value we seek. A numeric example is:

$$(3+4)mod5=2.$$

In the multiplication operation above, the polynomials are multiplied using standard techniques (always remembering to calculate the coefficients mod q), and the resulting polynomial is divided by P(x) to determine the remainder. Synthetic division may be used to perform the polynomial division (see also William H. Press, et al, *Numerical Recipes in C*, Cambridge University Press, Cambridge, 1988, p. 151).

Error correction codes can be expressed as a mapping function from a set of data words to a set of code words. For Reed-Solomon codes, this mapping function is typically one of two alternatives:

$$c = d \times g, \text{ or}$$

$$c = d \times s - [(d \times s) \bmod g]$$

where d is the data word expressed as a (power-of-y) polynomial of maximum degree (k−1), g is a generator polynomial with degree $r = q^m - 1 - k$, c is the code word having maximum degree $q^m - 2$, and s is a shift constant equal to $y^r$. For Reed-Solomon codes, the coefficients of the data, generator, and code word polynomials are traditionally 8-bit bytes that are treated as elements of $GF(2^8)$. Thus, the coefficients obey the rules set out above when added, subtracted, multiplied, or inverted. The placeholder powers of x used to define the properties of fields above should not be confused with placeholders for the code word polynomial equations here. Powers of y will be used for placeholders in these equations to reduce the chance of confusion.

For each of the two alternative mapping functions, the code word set consists of multiples of the generator polynomial g. However, in the second alternative the code word is "systematic", i.e., it includes a shifted (but otherwise unmodified) copy of the data word, along with some redundancy information (the bracketed term). The data word is unmodified because the data polynomial has been multiplied by the shift constant $y^r$ (so that the smallest power in the shifted data polynomial is $y^r$), and the remainder given by the modulo function is a polynomial with a maximum degree of (r−1).

The generator polynomial g for a Reed-Solomon code is calculated from a "primitive element" of the field $GF(q^m)$. A primitive element, hereafter denoted e, is an element of field $GF(q^m)$ that satisfies $e^j = 1$ for $j = (q^m - 1)$, but not for any positive value of j less than $(q^m - 1)$. Given a primitive element of $GF(q^m)$, the generator polynomial g can be calculated as:

$$g = (y - e^0)(y - e^1) \ldots (y - e^{r-1})$$

where r is the maximum number of errors that can be detected (or equivalently, the maximum number of erasures that can be corrected). The coefficients of the data word polynomial, generator polynomial, and code word polynomial are elements of $GF(q^m)$, traditionally $GF(2^8)$.

Referring back to FIGS. 2–4, in one embodiment, storage controller 401 is configured to generate redundancy information by applying an nth-order generator polynomial (where n is 2 or higher) to a data word polynomial to generate a code word that is stored to the array of storage devices 410. In the preferred implementation, the code word equation:

$$c = d \times s - [(d \times s) \bmod g]$$

is employed with the resulting code word polynomial including coefficients that are identical to coefficients of the data word polynomial along with coefficients that provide redundancy information. In the embodiment of FIG. 4, the calculation of the code word polynomial is performed by encoder 442.

It is noted that each data block and redundancy block of a given stripe corresponds to a particular term of the resulting code word polynomial following calculation of the above code word equation using a systematic shifting algorithm as discussed above. It is further noted that each data block stored on a particular device of array 410 may comprise multiple bytes of data. Similarly, each redundancy block stored in a corresponding device of array 410 may comprise multiple bytes of redundancy information. The calculation of the redundancy blocks is preferably done by taking one byte at a time from each of the data blocks to form a data polynomial, and performing the encoding operation to find a corresponding byte for each of the redundancy blocks. The calculation is repeated until redundancy information has been calculated for all of the bytes in the data blocks.

In one particular embodiment, the storage controller 401 calculates the R1 and R2 redundancy blocks using a two-term, second order Reed-Solomon generator polynomial over $GF(2^8)$. It is noted that the first redundancy term of the resulting code word polynomial is equal to a simple parity expression of the associated data words. Accordingly, this redundancy information may be used to support RAID 3, 4 and/or 5 configurations of storage controller 401 wherein a second redundancy term may be omitted from each stripe.

The number of storage devices in the array may be expressed as k+r, where r is the maximum number of simultaneous storage device faults that protection is desired for, and k is the number of data blocks in a data stripe. In one implementation, selection of the parameters $q^m = 256$ and $r = 2$ limits the size of the data word to k=253 coefficients, with each coefficient being an element of GF(256), i.e. an eight-bit byte. Thus the data word is limited to 253 bytes, and may have less. Multiplication in GF(256) may be implemented by lookup table rather than by repeated polynomial multiplication.

The last r bytes of the code word provide the corresponding bytes of the redundancy blocks. Thus, for example, if the blocks are 512 bytes each, the controller 401 determines 512 corresponding bytes for each of the redundancy blocks by applying corresponding bytes of each block to the generator polynomial. The data blocks and redundancy blocks are then written to the appropriate devices of array 410 in accordance with the stripe partitioning, as described previously. When r=2 the generator polynomial provides two redundancy blocks for a RAID 6 implementation. It is noted that in other embodiments, more than two redundancy blocks may be generated for each stripe by employing higher order generator polynomials, thereby supporting configurations that may sustain more than two device failures. It is also noted that in other embodiments, other specific stripe organizations may be supported. For example, in one implementation, the first redundancy block of each stripe may be stored on a first designated storage device, and the second redundancy block of each stripe may be stored on a second designated storage device similar to RAID 3 and RAID 4 implementations, rather than shifting the redundancy blocks as a function of the stripe as is typical in RAID 5 implementations.

Figure 6:
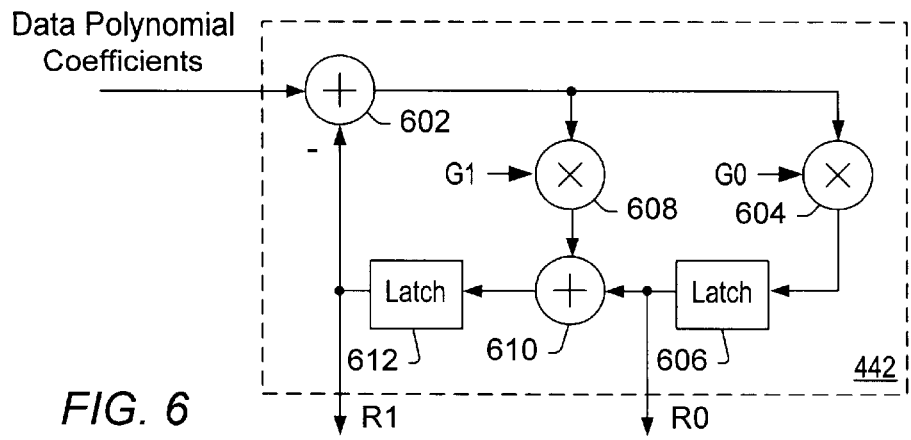
FIG. 6 shows an illustrative Reed-Solomon encoder implementation.

FIG. 6 shows an exemplary implementation of an encoder function for a Reed-Solomon code having r=2. The encoder 442 performs a modulo operation, dividing the (shifted) data polynomial by a generator polynomial $y^2 + G_1 y + G_0$ to determine the remainder $R_1 y + R_0$. The latches are reset to zero, and then the coefficients of the data polynomial are fed sequentially to encoder 442. After each coefficient is received, elements 602, 604, 608 and 610 operate on the coefficient and outputs of latches 606 and 612 to determine the subsequent latch inputs. The latches are then clocked to store the inputs before the next coefficient is received. The latches are clocked one final time after the last coefficient has been received. The latch outputs after this final clock provide the redundancy values $R_0$ and $R_1$.

Adder 602 subtracts the output of latch 612 from the received polynomial coefficient. Multipliers 604 and 608 multiply the difference by generator polynomial coefficients $G_0$ and $G_1$, respectively. Latch 606 stores the first product. Adder 610 adds the second product to the output of latch 606, and provides the sum to latch 612.

It is noted that in one embodiment, the functionality of encoder unit 442, difference unit 444, update unit 446, and/or decoder unit 448 may be implemented, or partially implemented, in software. Similarly, the functionality associated with device controller 440 may also be implemented in software.

Operations for performing a modified read/write stripe update are next considered. If only a subset of the data blocks in a stripe are changed due to a write operation to a portion of a stripe, it may be desirable to replace the existing stripe c with new stripe c' by performing a read modified write operation. The difference between the stripes is:

$$c' - c = \{d'xs - [(d'xs) \bmod g]\} - \{dxs - [(dxs) \bmod g]\}$$
$$= \{(d' - d)xs - [(d'xs) \bmod g - (dxs) \bmod g]\}$$

It is noted that the term in square brackets is a polynomial with a degree less than that of the generator polynomial g. Accordingly, the term in brackets can be manipulated in the following manner:

$$[(d'xs) \bmod g - (dxs) \bmod g] = [(d'xs) \bmod g - (dxs) \bmod g] \bmod g = (d'-d)xs \bmod g$$

Accordingly, the difference between the stripes is:

$$c'-c=(d'-d) \times s-(d'-d) \times s \bmod g$$

A modified read/write stripe update may therefore be performed by controller 401 by (1) determining the difference data word (d'−d), (2) determining the difference code word (c'−c), and (3) applying the difference code word to the original code word c. The difference data word is equal to zero in the unmodified data blocks, so the unmodified data blocks may be left undisturbed. The controller 401 may thus be configured to read the old version of the data blocks to be modified from array 410 and subtract the old version of the data blocks from the new version of the data blocks to determine the difference data blocks (on a per word basis).

The controller 401 may be configured to calculate the difference code word (c'−c) by performing the code word calculation discussed above using the difference data word (d'−d) and the generator polynomial. This may therefore be achieved by inputting the difference data word (d'−d) to encoder unit 442. In this calculation, only the redundancy terms of the resulting difference code word is of interest, and the remainder of the difference code word can be disregarded. The controller 401 may further be configured to read the original redundancy blocks of the stripe from array 410, and add the corresponding redundancy block difference to the respective original redundancy blocks (on a per-word basis) to form the new redundancy blocks to be stored in array 410.

The handling of errors due to, for example, device failures is next considered. In this event, the failed device(s) may provide a failure signal(s) to controller 401. The received code word c' (i.e., having terms corresponding to the data words and redundancy words) from the disk array is:

$$c'=c+u$$

where c is the uncorrupted code word and $u=u_0 y^{L0}+u_1 y^{L1}$ represents the errors caused by the device failure(s) at positions L0 and L1 in the code word. As long as the number of device failures is less than or equal to r, the errors satisfy the following equation $$\begin{bmatrix} (e^0)^{L0} & (e^0)^{L1} \\ (e^1)^{L0} & (e^1)^{L1} \end{bmatrix} \begin{bmatrix} u_0 \\ u_1 \end{bmatrix} = \begin{bmatrix} c' \bmod(y-e^0) \\ c' \bmod(y-e^1) \end{bmatrix}$$

This equation can be solved using a variety of techniques (including Cramer's Rule). Where only one error is present, L1 may be chosen randomly (but not set equal to L0), and the equation evaluated to verify that $u_1=0$. Once the error(s) have been determined, the original code word c can be recovered.

Using Cramer's rule, closed-form expressions for the errors may be found:

$$u_0 = \frac{c' \bmod(y-e^0) \times e^{L1} - c' \bmod(y-e^1)}{e^{L1} - e^{L0}}$$

$$u_1 = \frac{c' \bmod(y-e^1) - c' \bmod(y-e^0) \times e^{L0}}{e^{L1} - e^{L0}} = c' \bmod(y-e^0) - u_0$$

Thus, decoder unit 448 may be configured to decode the code word c' using the code word terms read from array 410 and the positions of the errors L0 and L1 to determine a correct code word c. The terms of the correct code word c at the positions identified by L0 and L1 represent corrected data that may be provided from controller 401 in response to an access request through the I/O bus.

Figure 7:
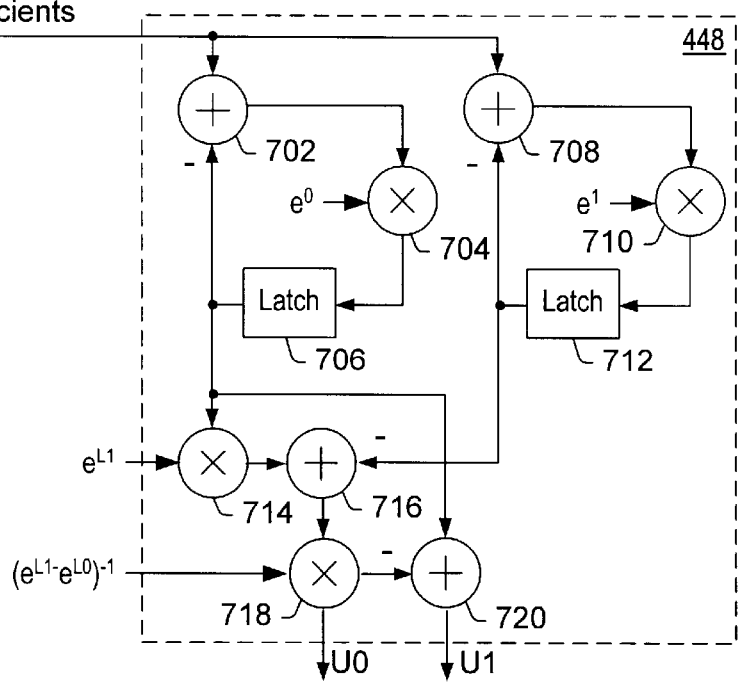
FIG. 7 shows an illustrative Reed-Solomon decoder implementation.

FIG. 7 shows an exemplary implementation of a decoder function 448 for a Reed-Solomon code having r=2. As with the encoder, the latches are reset to zero, and then the polynomial coefficients of the code word are provided sequentially. Elements 702, 704, 708, and 710, operate on the received coefficient and the latch outputs to determine the subsequent latch inputs. The latches are clocked after each coefficient is received.

Decoder 448 may best be understood in terms of three portions. The first portion includes elements 702–706, and operates to calculate c' mod $(y-e^0)$. The second portion includes elements 708–712, and operates to calculate c' mod $(y-e^1)$. These terms are commonly called the "syndromes" of the received code word. The third portion includes elements 714–720, which calculates the errors $u_0$ and $u_1$ from the syndromes and from terms that indicate the error locations L0 and L1. Each of these portions is now discussed in more detail.

The first and second portions initially have latches 706 and 712, respectively, set to zero. As the code word polynomial coefficients are provided sequentially to the first and second portions, the adder 702 subtracts the output of the latch 706 from the received coefficient. Multipliers 704 multiplies the difference by $e_0$ (as $e_0=1$, this step is shown only for the sake of completeness), and the resulting product is provided as the input to latch 706. The latch 706 stores the product before the subsequent polynomial is received. The second portion's adder 708, multiplier 710, and latch 712 operate similarly. The latches' storing operation after the last code word coefficient is received will store the desired syndromes. At this time, multiplier 714 multiplies the first syndrome by $e^{L1}$. Adder 716 subtracts the second syndrome from this product. The multiplier 718 multiplies the difference from adder 716 by $(e^{L1}-e^{L0})^{-1}$. The output of multiplier 718 is the first error value $u_0$ as given by the first expression from Cramer's rule. Adder 720 subtracts this value from the first syndrome to provide the second error value $u_1$.

Figure 8:
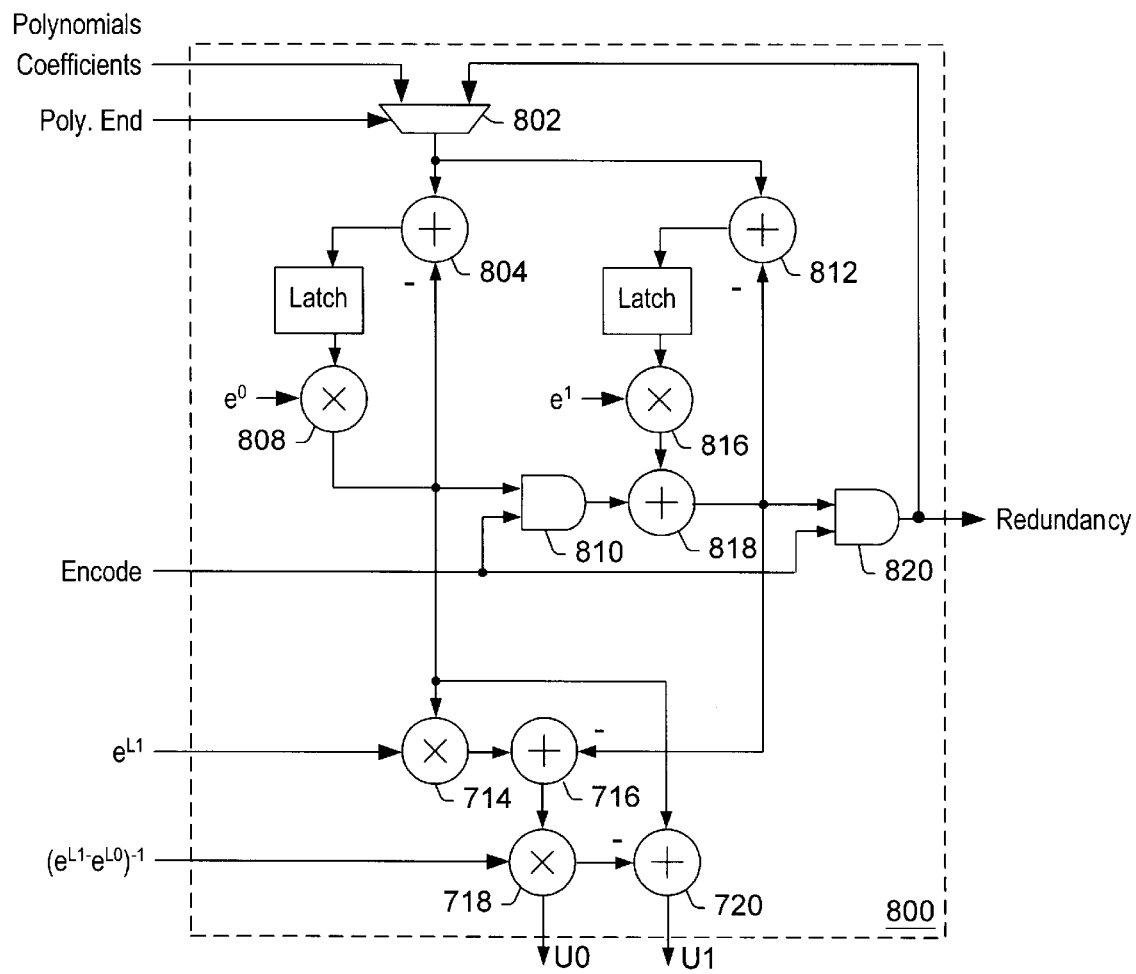
FIG. 8 shows a combined encoder/decoder implementation.

FIG. 8 shows a combined encoder/decoder implementation 800. The combined implementation 800 includes a multiplexer 802, a first stage 804–810, a second stage 812–820, and the third portion 714–720 from FIG. 7. Multiplexer 802 is controlled by a POLYNOMIAL END signal which is de-asserted until after all polynomial coefficients have been provided. During the encode process, the POLYNOMIAL END signal remains asserted for r=2 cycles after the end of the data polynomial. This signal plays no role during the decode process, remaining de-asserted throughout.

The first and second stages of FIG. 8 may be compared to the first and second portions of the decoder in FIG. 7. The first stage includes an adder 804, a latch 806, and a multiplier 808 that operate similarly to the adder 702, latch 706, and multiplier 704. So too the second stage. In addition, the first and second stages include logical AND gates 810, 820, respectively. These gates are controlled by an ENCODE signal, which is asserted throughout the encoding process, and which is de-asserted throughout the decoding process. When the ENCODE signal is de-asserted, the first and second stages are isolated, and they operate in the same manner as the first and second portions of the decoder in FIG. 7 to calculate the syndromes when the code word polynomial coefficients are provided sequentially to the multiplexer 802. The third portion is provided to calculate the error values from the syndromes.

When the ENCODE signal is asserted, the first and second stages are coupled, and adder 818 makes the output of the second stage equal to the sum of the outputs from the two stages. It can be shown that the combination of the stages divides the (shifted) data polynomial by the product $(y-e^0)(y-e^1)$. Latch 814 sequentially stores the coefficients of the quotient, and the output of logical AND gate produces the redundancy coefficients in order (R1, R0) on the cycles immediately following the last coefficient of the data polynomial (i.e. the cycles during the assertion of the POLYNOMIAL END signal).

It is noted that the various encoder and decoder embodiments shown are given for Reed-Solomon codes having a redundancy parameter of r=2. These embodiments can be extended to higher orders simply by providing additional stages.

Figure 5:
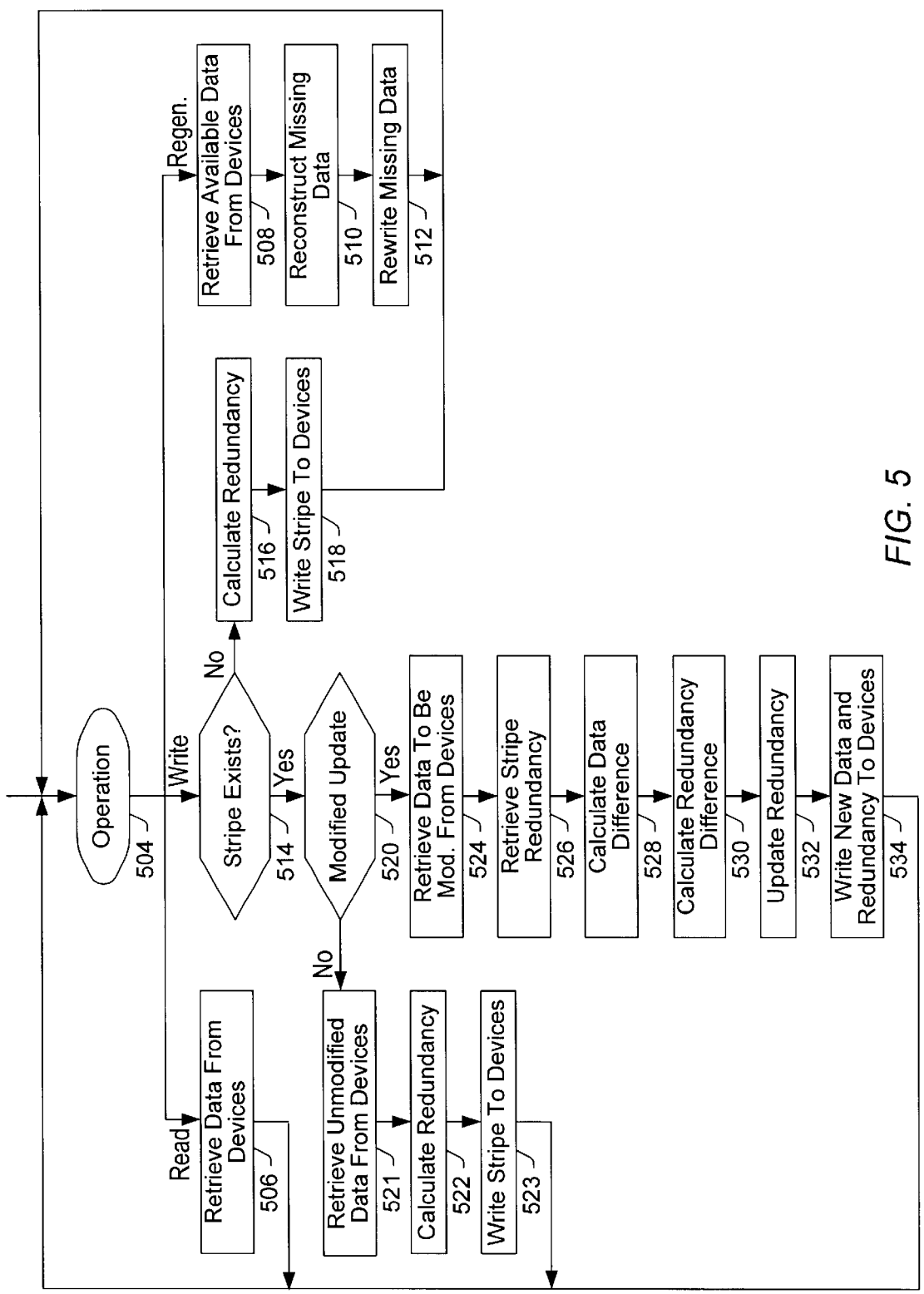
FIG. 5 shows a flowchart of a method for controlling a storage device array.

In one implementation, the device controller 440 (FIG. 4) may operate in accordance with the flowchart shown in FIG. 5. For a WRITE operation, the device controller 440 determines in step 514 whether the WRITE operation is a modification of an existing stripe. If not, in step 516 the controller 440 causes the encoder 442 to calculate the stripe redundancy, and in step 518, writes the stripe data and redundancy to the storage devices. Steps 516 and 518 may be performed concurrently.

If the WRITE operation is a modification of an existing stripe, then in step 520, the controller 440 determines whether to perform a modified read/write stripe update or an unmodified read/write stripe write. For an unmodified read/write stripe update, in step 521, the controller 440 retrieves the unmodified data blocks from the storage devices. The unmodified data blocks are then used in conjunction with the new data blocks in step 522 to calculate the redundancy blocks, and the stripe is written to array 410 in step 523.

A REGENERATION operation may be used to correct data and to reconstruct data on a new storage device. For a REGENERATION operation, the device controller 440 retrieves available data from the storage devices in block 508. Any erroneous data is reconstructed by decoder unit 448 in step 510, and in step 512, the reconstructed data is written back to the storage devices. The reconstructed data may be additionally or alternatively provided to a host via the I/O bus. Steps 508, 510, and 512 may be performed concurrently until the new storage device is provided a complete copy of the missing data.

For a modified read/write update, in step 524 the controller 440 retrieves the data blocks to be modified from the storage devices. In step 526, the controller 440 retrieves the stripe redundancy. In step 528, the controller 440 causes the difference unit 444 to determine the difference between the new data blocks and the data blocks to be modified. In step 530, the controller 440 causes the encoder unit 442 to determine the redundancy difference using the data difference (i.e., by inputting the difference data words of a difference data block to encoder unit 442). In step 532, the controller 440 causes the update unit 446 to combine the redundancy difference with the old redundancy blocks read from array 410 to determine new stripe redundancy blocks. In step 534, the controller 440 writes the new data blocks and the new redundancy blocks to the storage devices. Steps 524–534 may be performed concurrently.

It is noted that in the embodiment described above, addition and subtraction operations are equivalent, and may each be implemented by a bit-wise XOR operation.

It is further noted that while array 410 in the embodiment described above includes a plurality of hard disk drives, arrays using other types of storage devices, such as tape drives, may be employed.

In addition, as noted previously, in embodiments that calculate redundancy blocks using a two-term, second order Reed-Solomon generator polynomial, the first redundancy term of a resulting code word polynomial is equal to a simple parity expression of the associated data words. This single redundancy term may thus be used to support RAID 3, RAID 4, and/or RAID 5 configurations in addition to the multiple redundancy block configurations described above. Such additional RAID configurations may be programmable by a user as desired, and may be supported without extensive changes or additions to the Reed-Solomon encoding and decoding functionality as described.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A data storage subsystem that comprises:
   an array of storage devices configured to store information in the form of a plurality of stripes; and
   a storage controller coupled to the storage devices and configured to write a plurality of code words forming each stripe to said array,
   wherein said plurality of code words represents a systematic Reed-Solomon mapping of a plurality of data blocks and comprises said plurality of data blocks and a distinct plurality of redundancy blocks, and
   wherein the storage controller is configurable to update a subset of data blocks in a target stripe by:
   reading original data from said subset,
   reading original redundancy information from the plurality of redundancy blocks in the target stripe,
   determining a data difference between new data and the original data,
   determining a redundancy difference from the data difference,
   applying the redundancy difference to the original redundancy information to obtain updated redundancy information, writing the new data to the subset of data blocks, and writing the updated redundancy information to the redundancy blocks in the target stripe.

2. The subsystem of claim 1, wherein the plurality of redundancy blocks consists of two blocks.

3. The subsystem of claim 1, wherein the storage controller determines the redundancy difference by encoding the data difference using an error correction code.

4. The subsystem of claim 1, wherein the storage controller determines the redundancy difference by applying a Reed-Solomon code generator polynomial to the data difference.

5. The subsystem of claim 4, wherein the Reed-Solomon code generator polynomial is $g=(y-e^0)(y-e^1)$, wherein the coefficient field is GF(256), and wherein e is a primitive element of coefficient field GF(256).

6. The subsystem of claim 4, wherein the redundancy difference is:

$$(d'-d) \times s \bmod g,$$

where $(d'-d)$ is the data difference between original data d and new data d', g is the generator polynomial, and s represents $y^r$, r being the degree of g.

7. The subsystem of claim 6, wherein the updated redundancy information equals the exclusive-or (XOR) of the original redundancy information with the redundancy difference.

8. The subsystem of claim 1, wherein the array of storage devices comprises disk drives.

9. A method of updating data in an array of storage devices having data stored in a plurality of stripes, each stripe including one corresponding block from each storage device, the method comprising:

reading original data from a subset of data blocks in a target stripe, wherein said target stripe comprises a plurality of code words representing a systematic Reed-Solomon mapping of said data blocks and wherein said plurality of code words comprises said data blocks and a distinct plurality of redundancy blocks, and;

reading original redundancy information from said plurality of redundancy blocks in the target stripe;

determining a data difference between new data and the original data;

determining a redundancy difference from the data difference;

applying the redundancy difference to the original redundancy information to obtain updated redundancy information;

writing the new data to said subset of data blocks in the target stripe; and writing the updated redundancy information to said plurality of redundancy blocks in the target stripe.

10. The method of claim 9, wherein the plurality of redundancy blocks consists of two blocks.

11. The method of claim 9, wherein said determining the redundancy difference includes encoding the data difference using an error correction code.

12. The method of claim 9, wherein said determining the redundancy difference includes applying a Reed-Solomon code generator polynomial to the data difference.

13. The method of claim 12, wherein the Reed-Solomon code generator polynomial is $g=(y-e^0)(y-e^1)$, wherein the coefficient field is GF(256), and wherein e is a primitive element of coefficient field GF(256).

14. The method of claim 12, wherein the redundancy difference is:

$$(d'-d) \times s \bmod g,$$

where $(d'-d)$ is the data difference between original data d and new data d', g is the generator polynomial, and s represents $y^r$, r being the degree of g.

15. The method of claim 14, wherein the updated redundancy information equals the exclusive-or (XOR) of the original redundancy information with the redundancy difference.

16. The method of claim 9, wherein the array of storage devices comprises disk drives.

17. A data storage subsystem that comprises:

an array of storage devices configured to store information in the form of a plurality of stripes; and a storage controller coupled to the storage devices and configured to write a plurality of data blocks and a plurality of redundancy blocks forming each stripe to said array, said storage controller comprising a combined encoder/decoder circuit, wherein during an encoding mode of operation, said combined encoder/decoder circuit is configured to generate said plurality of redundancy blocks using an nth order generator polynomial where n is 2 or greater, wherein during a decoding mode of operation, said combined encoder/decoder circuit is configured to calculate error terms from said plurality of data blocks and said plurality of redundancy blocks, and wherein said storage controller is configured to utilize said error terms to recover information from up to n failed storage devices in said array performing multiple erasure correction.

18. The data storage subsystem as recited in claim 17 wherein said plurality of redundancy blocks is generated using a Reed-Solomon code.

* * * * *